No. 782,353.

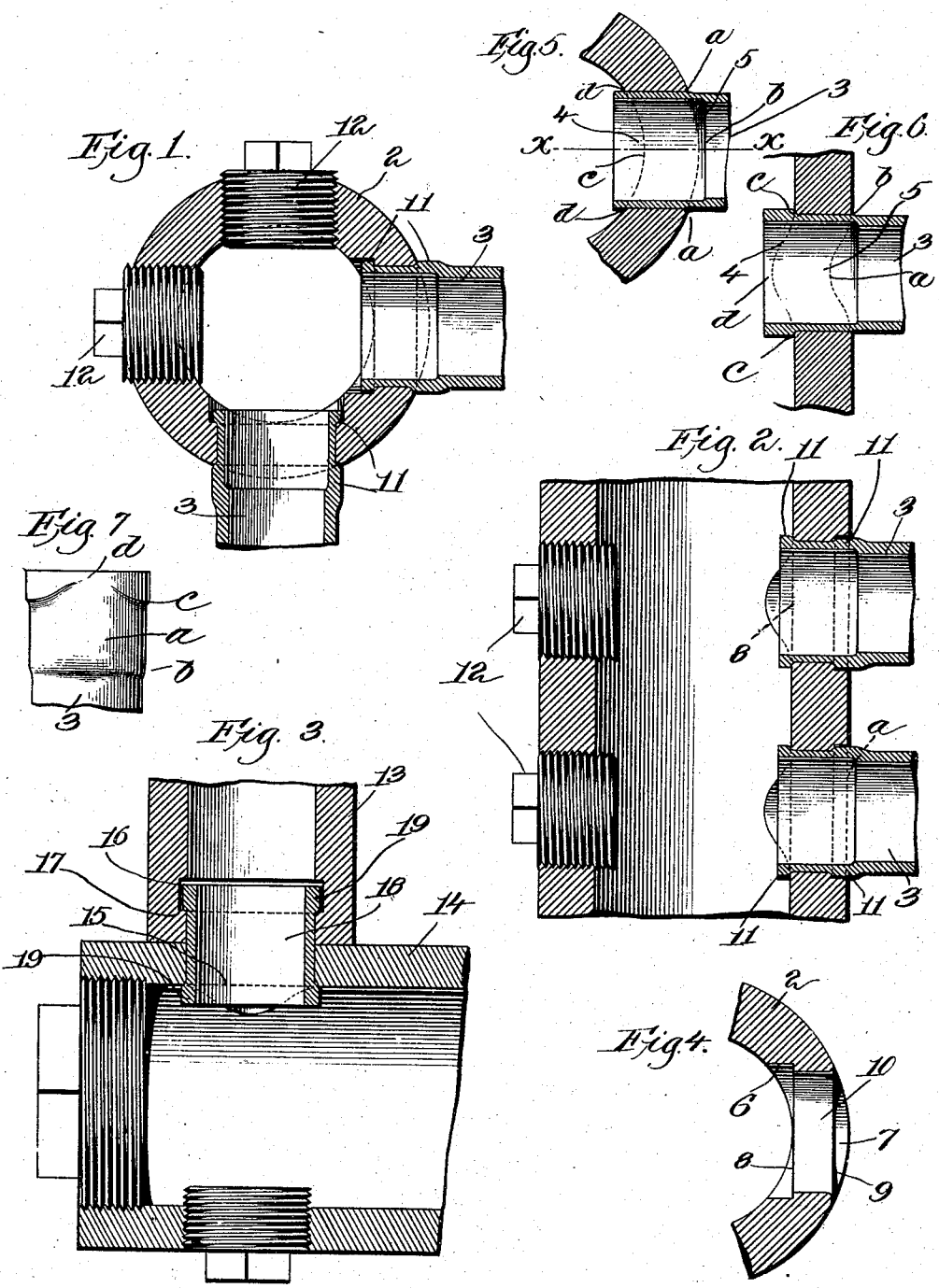

Patented February 14, 1905.

UNITED STATES PATENT OFFICE.

JAMES M. McCLELLON, OF EVERETT, MASSACHUSETTS.

HEADER CONSTRUCTION.

SPECIFICATION forming part of Letters Patent No. 782,353, dated February 14, 1905.

Application filed December 12, 1904. Serial No. 236,487.

*To all whom it may concern:*

Be it known that I, JAMES M. McCLELLON, a citizen of the United States, residing at Everett, in the county of Middlesex and State of Massachusetts, have invented an Improvement in Header Construction, of which the following description, in connection with the accompanying drawings, is a specification, like characters on the drawings representing like parts.

This invention relates to header construction.

Heretofore headers for steam-boilers have commonly been made of cast-iron or cast-steel; but this material is not satisfactory where high pressures are used or where the header is subjected to the strains which are incident to its use in a locomotive, and therefore wrought-iron or wrought-steel headers are generally coming into use. When the wrought-iron or wrought-steel headers are made from what is known to the trade as "mechanical tubing," which has a curvilinear exterior and interior surface, it is very difficult, if not impossible, to expand the ends of water-tubes thereinto and make a tight joint, partly because the exterior and interior shoulders, which define the limits of the aperture through the header into which the tube is inserted, follow the curved surfaces of said header and partly because the thickness of the material of the header varies at different points on the inner surface of the hole in which the water-tube is inserted. In my experiments with headers of this construction I have devised a way of forming said headers so as to make it possible to secure an absolutely tight joint at the point where the water-tubes are expanded into the header, and to do this I counterbore the tube-receiving apertures in the header, so as to leave a rib of uniform thickness extending around the walls of the aperture, the edges of said ribs furnishing shoulders over which the tube may be expanded. The counterboring is done so that these annular shoulders stand in planes perpendicular to the direction of the length of the aperture, and thus make it possible to expand the tube end into said aperture in the same way that a tube is expanded into an aperture in any ordinary sheet or plate.

In the drawings, Figure 1 is a cross-section through a header embodying my improvements, said header having two tubes expanded thereinto. Fig. 2 is a section longitudinally of the header. Fig. 3 shows a modification. Fig. 4 is a detail of a portion of a header after the tube-apertures have been drilled and counterbored and before the tube is expanded thereinto. Fig. 5 shows the result of attempting to expand a tube in a tubular header where the header does not embody my invention. Fig. 6 is a section on line $xx$, Fig. 5; and Fig. 7 is a detail hereinafter referred to.

In the drawings, 2 designates a tubular header made of what is commonly known in the trade as heavy "mechanical tubing"— that is, drawn tubing, which under some conditions requires more or less machining to reduce it to the proper dimensions or give it the desired shape for use.

The header herein illustrated has a tubular form.

3 designates water-tubes which are to be expanded into said header. The usual way of thus expanding tubes into headers is to provide the header with an aperture through which the end of the tube is inserted and thereafter operate on the inside of the tube with any suitable expanding device, which expands the tube and crowds portions of the metal thereof over the shoulders constituting the edges of the tube-receiving aperture in the header. In the case of a tubular header as shown in the drawings the edges of the tube-receiving aperture would naturally be curved, as shown at 4 and 5, Figs. 5 and 6, and different points of said edges would lie in different planes taken at right angles to the axis of the tube.

To attempt to expand a tube 3 into a tubular header, as shown in Figs. 5 and 6, will not prove successful, partly because the edges 4 and 5, over which the material is crowded by the expanding operation, do not lie in parallel planes standing at right angles to the axis of the tube and partly because the metal of the tube will be crowded to a greater extent over the shoulders at certain points than at other points. For instance, the metal of the tube will be crowded over the shoulder 4 at the point $c$, Fig. 6, to a much greater extent than at the point *d*, Fig. 5, and it will not be crowded over the shoulder 5 at points *a* and *b* or at any other point to any appreciable extent. The result is that at the points *a* and *c* a tight joint will be effected, but not at the points *b* and *d*. Moreover, because of the curvilinear shape of the shoulders 4 and 5 the tube is not firmly held in the header, and any lateral strain on the tube is very likely to loosen it from the header. To obviate all of these difficulties and to provide a header of this nature into which the tubes can be expanded so as to make a tight joint, I counterbore the tube-receiving aperture in the header at one or both ends, if necessary, and thereby obtain shoulders which lie in parallel planes at right angles to the axis of the tube and over which the metal of the tube may be expanded. As shown in Fig. 4, the tube-receiving aperture is counterbored at its inner end, as at 6, and at its outer end, as at 7. The counterbore extends sufficiently into the metal of the tube to bring the edges 8 and 9 of the tube-receiving aperture into parallel planes which extend at right angles to the axis of the aperture. This leaves an annular rib 10, which incloses the tube-receiving bore. After the tubular headers have been thus drilled and counterbored the water-tubes 3 are inserted in the bores and expanded, as usual, the expanding operation resulting in crowding portions of the metal, as at 11, over the shoulders 8 and 9, as shown in Figs. 1 and 2. Since the shoulders 8 and 9 stand in parallel planes at right angles to the direction of length of the tube, the said tube can be expanded over them to produce as tight a joint as could be produced where a tube is expanded into an ordinary plate or sheet, for the rib 10 is, in effect, that portion of a sheet or shell immediately surrounding a tube-receiving aperture. To permit the counterboring and expanding operations to take place, I propose to provide the headers with an aperture opposite each tube-receiving opening and to close said apertures by suitable plugs 12. Where the tubular headers are curvilinear both exteriorly and interiorly, I propose to counterbore both ends of the tube-receiving apertures. Some headers, however, are made flat-sided exteriorly and round interiorly, and in such event it will be necessary to counterbore the interior of the tube only. On the other hand, where the header is flat-sided interiorly and curvilinear exteriorly it would be necessary to counterbore the exterior end only of the tube-receiving aperture.

In Fig. 3 I have illustrated the manner of applying my invention to a construction in which the end of one tubular header is to be connected to the side of another tubular header. In this embodiment of my invention 13 designates one tubular header, the end of which is to be connected to the side of another tubular header, 14. To accomplish this, the header 14 is provided with a nipple or tube receiving aperture, and the inner end of said aperture will be counterbored to form the annular shoulder 15. The interior of the tubular header 13 is also counterbored, as at 16, to form an annular shoulder 17, which is in a plane parallel to the shoulder 15. The connection between the two headers is made by a suitable nipple 18, and the expanding of the nipple to make the tight joint crowds portions 19 of the material of the nipple over the shoulders 15 and 17. For the purpose of facilitating the operation the header 14 may be provided with a plug-aperture opposite the nipple-receiving aperture.

By means of my invention it is possible to use mechanical tubing for headers and to obtain as tight a joint between said headers and the water-tube as could be obtained between water-tubes in ordinary sheets or plates.

Having fully described my invention, what I claim as new, and desire to secure by Letters Patent, is—

1. A tubular wrought-iron or wrought-steel header or manifold curvilinear interiorly, said manifold being provided with one or more tube-receiving apertures, the inner end of each aperture being counterbored to present an annular flat surface surrounding said aperture in a plane at right angles to the direction of the aperture.

2. A tubular wrought-iron or wrought-steel header or manifold curvilinear interiorly, said manifold being provided with one or more tube-receiving apertures, the inner end of each aperture being counterbored to present an annular flat surface surrounding said aperture in a plane at right angles to the direction of the aperture, combined with a tube expanded in said tube-receiving aperture.

3. A wrought-iron or wrought-steel header or manifold curvilinear exteriorly in cross-section and having a tube-receiving aperture, the outer end of said aperture being counterbored to form an annular shoulder situated in a plane perpendicular to the axis of said aperture.

4. A wrought-iron or wrought-steel header or manifold curvilinear exteriorly in cross-section and having a tube-receiving aperture, the outer end of said aperture being counterbored to form an annular shoulder situated in a plane perpendicular to the axis of said aperture, combined with a tube expanded in said aperture, the metal of the tube being crowded over said shoulder by the expanding operation.

5. A cylindrical tubular header or manifold having one or more tube-receiving openings leading thereto, the outer and inner ends of said openings being counterbored to form between the counterbores an annular rib of uniform thickness.

6. A cylindrical tubular header or manifold having one or more tube-receiving apertures leading thereto, the inner and outer ends of said apertures being counterbored to form between the counterbores an annular rib of uniform thickness, combined with water-tubes expanded in said tube-receiving apertures, the metal of the tubes being crowded over the shoulders or edges of said ribs by the expanding operation.

In testimony whereof I have signed my name to this specification in the presence of two subscribing witnesses.

JAMES M. McCLELLON.

Witnesses:
  LOUIS C. SMITH,
  MARGARET A. DUNN.